United States Patent [19]

Richardson

[11] 3,942,681
[45] Mar. 9, 1976

[54] FLANGE PROTECTOR

[76] Inventor: Ernest T. Richardson, 312 Sneed, Berwick, La. 70342

[22] Filed: Dec. 31, 1974

[21] Appl. No.: 537,693

Related U.S. Application Data

[63] Continuation of Ser. No. 415,216, Dec. 12, 1973, abandoned.

[52] U.S. Cl. ............... 220/324; 220/326; 138/96 R
[51] Int. Cl.² .................. B65D 41/00; B65D 45/00
[58] Field of Search .......... 220/324, 326, 328, 315; 138/96 R; 292/57

[56] References Cited
UNITED STATES PATENTS

| | | | |
|---|---|---|---|
| 973,794 | 10/1910 | Lightcap | 220/327 |
| 1,089,066 | 3/1914 | Meyer | 220/326 |
| 1,857,665 | 5/1932 | Sebell | 292/253 |
| 2,082,144 | 6/1937 | Bowers | 138/96 R |
| 2,617,554 | 11/1952 | Smith | 220/328 |
| 3,046,853 | 7/1962 | Legendre | 220/353 |
| 3,672,532 | 6/1972 | Becker | 220/324 |
| 3,685,684 | 8/1972 | Schindler et al. | 220/324 |

Primary Examiner—William Price
Assistant Examiner—Joseph M. Moy
Attorney, Agent, or Firm—W. F. Hyer; Marvin B. Eickenroht

[57] ABSTRACT

There is disclosed a device comprising a disc for disposal over the outer side of a flange, an annular ridge on the disc for substantially filling a ring groove in the outer side of the flange, a plurality of plugs on the disc for fitting closely within certain holes of a circle of bolt holes through the flange, and fasteners for holding the plugs in the bolt holes.

9 Claims, 5 Drawing Figures

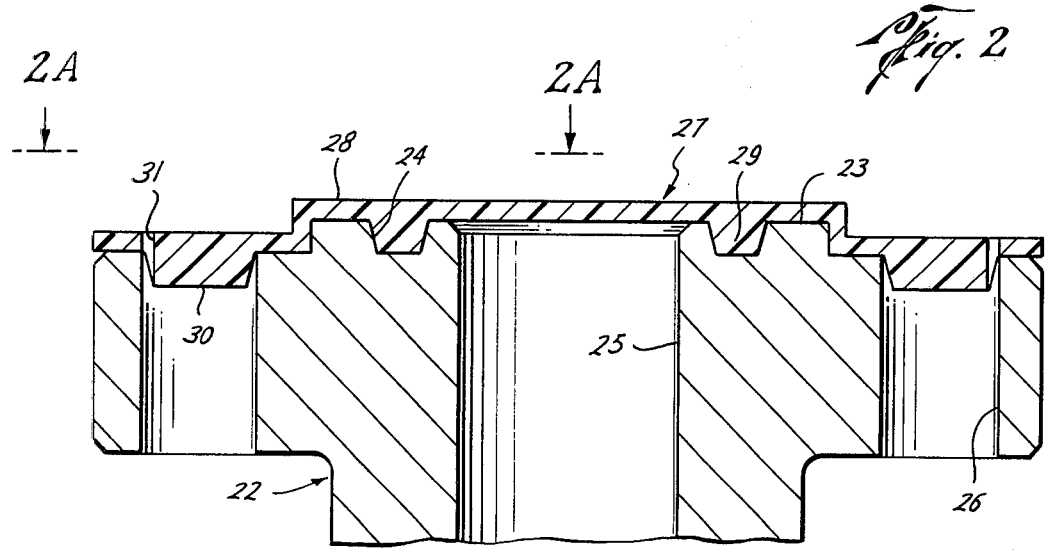
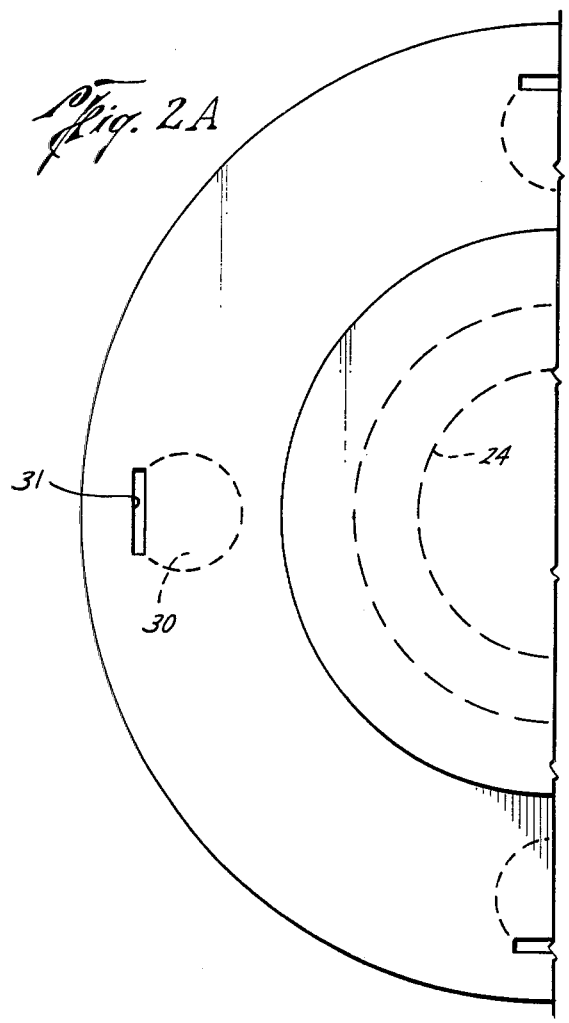
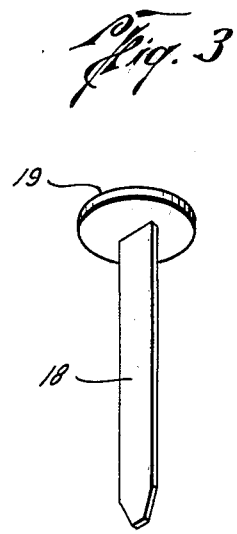

FLANGE PROTECTOR

This is a continuation of application Ser. No. 415,216, filed Dec. 12, 1973 now abandoned.

This invention relates to an improved device for protecting a flange of the type having an annular seal groove in the outer side thereof and a circle of bolt holes therethrough arranged concentrically outwardly of the groove.

In use, the groove in the flange is adapted to receive a seal ring for sealing between it and a corresponding groove in the oppositely facing side of another flange, and the holes are adapted to be aligned with corressonding holes through the other flange for receiving bolts for connecting the flanges together. When the flanges are so connected, the seal ring, which may be a standard metal A.P.I. ring, is compressed into sealing engagement with the grooves to thereby provide a sealed connection between the flanges.

In order to protect the seating surfaces of the groove against damage, as might occur during storage or transportation, it has been proposed to cover the outer side of the flange with a disc of fiberboard. The disc is provided with slits aligned with certain of the bolt holes so that fasteners may be extended through the slits and aligned holes for securing the disc in covering position. These fasteners have enlarged upper ends for bearing on the outer side of the disc and are flexible to permit their opposite ends to be bent under the inner side of the flange. Generally, washers are provided each for bearing over the inner side of the flange about each bolt hole, so as to provide a wide bearing surface for the bent end of the fastener and thus reduce the possibility of its being pulled free.

However, it has been found that the existing devices do not protect the seal groove in the flange under certain conditions which often occur during transportation or storage of the flange. For example, heavy blows against the outer side of the disc may break or distort the disc, and thus cause damage to the seal groove. Also, the fasteners are often incapable of preventing the disc from being laterally displaced, and actually removed from the outer side of the flange, in which case the ring is exposed to not only damaging blows and scratches, but also corrosion, etc.

An object of this invention is to provide a device which protects the flange against heavy blows, and which is retained against lateral displacement.

Another object is to provide such a device which may be manufactured with a minimum of time and expense.

A further object is to provide such a device which is easily and quickly installed over or removed from the outer side of the flange.

Yet another object is to provide such a device which may be stored in a small space.

In the drawings, wherein like reference characters are used throughout to designate like parts:

FIG. 2 is a vertical sectional view of another type of flange also having a device constructed in accordance with another embodiment of the present invention disposed over the outer side thereof;

FIG. 2A is a partial top plan view of the protector of FIG. 2, as seen along broken line 2A—2A thereof; and FIG. 3 is a perspective view of one of the fasteners used for retaining the plugs of the device in the bolt holes of the flanges.

Figure 1:
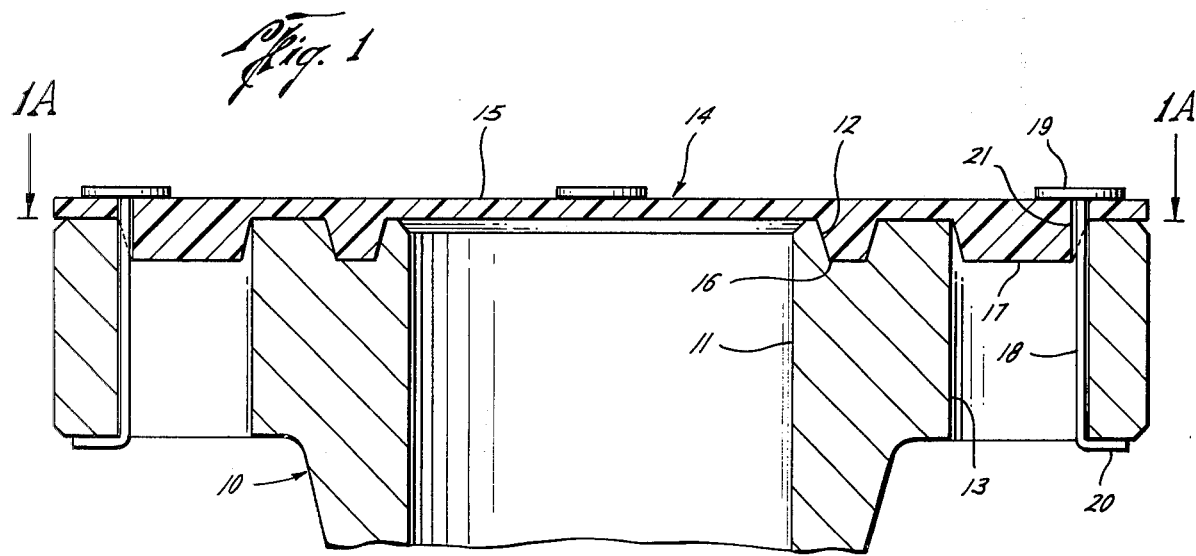
FIG. 1 is a vertical sectional view of a flange, as seen along broken line 1—1 of FIG. 1A, having a device constructed in accordance with the present invention disposed over its outer side for protecting the seal groove.
Figure 1A:
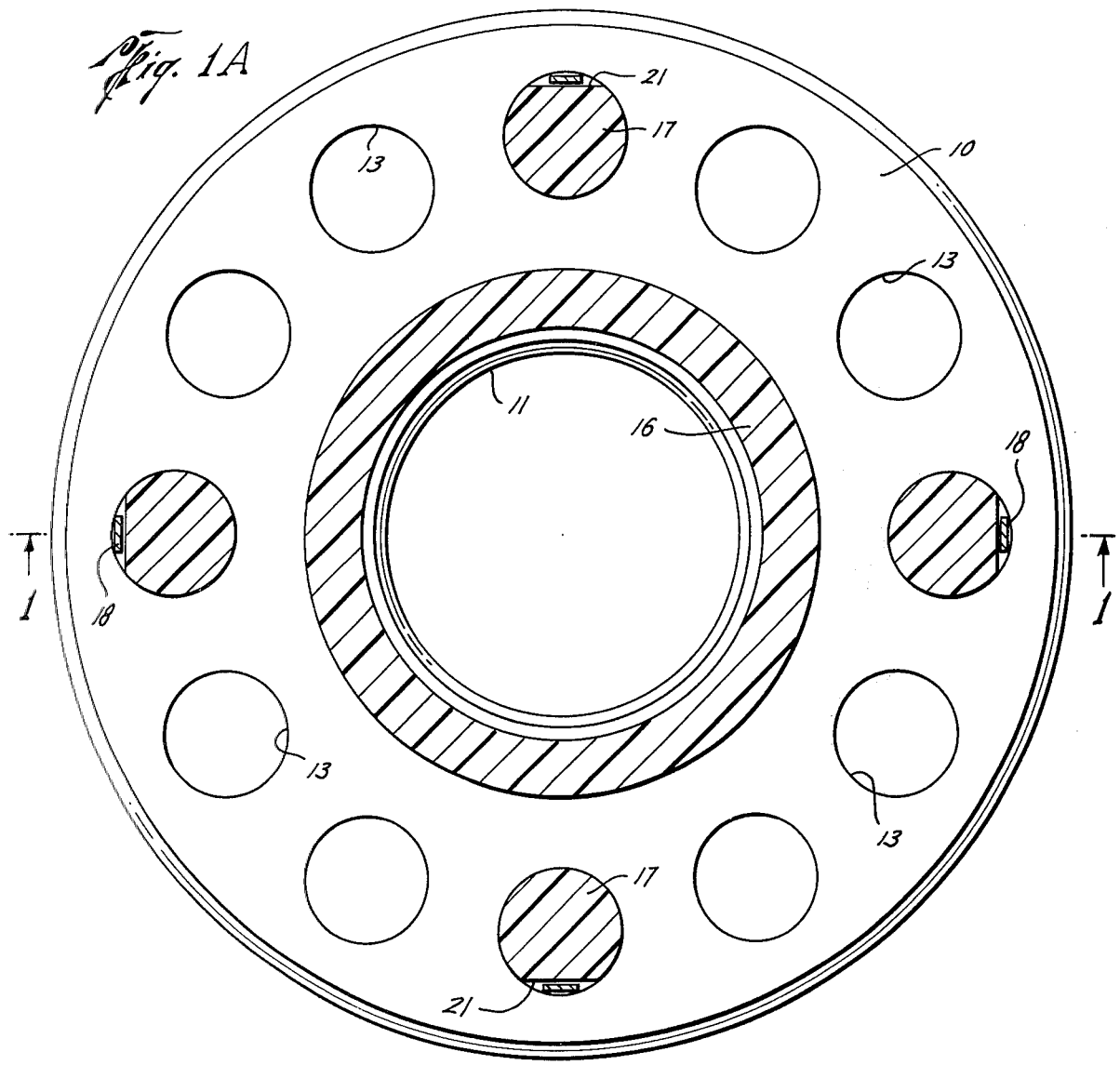
FIG. 1A is a horizontal cross-sectional view of the flange and protector device of FIG. 1, as seen along broken lines 1A—1A of FIG. 1.

With reference now to the details of the above-described drawings, the flange 10 shown in FIGS. 1 and 1A has a central bore 11 therein, a ring groove 12 formed in its outer (or upper as seen in FIG. 1) side in surrounding relation to the bore 11, and a circle of bolt holes 13 therethrough arranged concentrically outwardly of the ring groove 12. As well known in the art, the flange may be integral with or connected to a conduit (not shown) with its bore aligned with the bore through the conduit so as to provide a means on one end of the conduit for connecting it to a flange of another conduit.

For this latter purpose, and as well known in the art, the groove 12 is adapted to receive a ring, such as a standard metal A.P.I. ring, for forming a seal between the flange 10 and another flange having an oppositely facing groove therein. Thus, as well known in the art, with the seal ring disposed within the oppositely facing grooves, so as to space the oppositely facing sides of the flanges from one another, bolts may be extended through the holes 13 and a matching circle of holes on the other member to receive nuts for drawing the flanges toward one another and thus causing the seal ring to be tightly compressed into sealing engagement with the grooves in the flanges.

The device for protecting the flange, particularly the seal groove 12 thereof, and indicated in its entirety in FIG. 1 by reference character 14, comprises a disc 15 of a diameter at least approximating that of the flange 10 and adapted to fit flat against the outer side of the flange. An annular ridge 16 is arranged on the inner side of the disc 15 for substantially filling the ring groove 12, and a plurality of plugs 17 are arranged thereon for fitting closely within certain of the bolt holes 13. Since the ridge fills the groove, it protects it against damage from blows delivered to the device, even when the outer face of the disc itself might be damaged. On the other hand, the plugs resist any tendency of the disc to move laterally out of its position covering the ring groove in the flange.

As also shown in FIG. 1, the plugs 17 are of generally frusto-conical shape with a diameter at the base thereof which is slightly larger than that of the bolt to engage tightly therewith as the plugs are forced into the holes. As shown in FIG. 1A, there are four such plugs arranged in equally spaced, diametrically opposed relation for fitting within similarly arranged holes. However, a lesser number of plugs may be used, having in mind that at least two generally equally spaced-apart plugs are needed for balancing the resistance to lateral movement of the disc of the protector 14.

Each plug is held within the bolt hole into which it is fitted by means of a fastener 18, which further reduces any tendency of the disc to be moved laterally out of position over the flange. As best shown in FIG. 3, each fastener comprises a thin strip of sheet metal having an enlarged head 19 at its upper end and being bendable to permit the lower portion 20 thereof to be turned under the inner side of the flange for bearing thereagainst so as to hold the plug through which it extends in the bolt hole. More particularly, the length of each fastener extends through a narrow opening 21 formed through the disc and the plug tangent to the outer side of the plug, whereby it will lie against the outer side of the bolt hole beneath the plug.

The flange 22 shown in FIG. 2 is similar to the flange 10, except that the central portion 23 of its outer side is raised above the outer portion thereof. As shown in FIG. 2, the ring groove 24 is formed in the raised portion concentrically about the bore 25 through the flange, and the circle of bolt holes 26 is formed through the outer portion of the flange. The device for protecting the flange 22, and particularly the ring groove 24 therein, is designated in its entirety by reference character 27 and comprises, similarly to the device 14, a disc 28 having an inner side disposable over the outer side of the flange. Also, an annular ridge 29 is carried on the disc for substantially filling ring groove 24, and a plurality of plugs 30 are carried thereon for fitting closely within certain of the bolt holes 26. However, the disc 28 of the device 27 is formed with a raised, central portion, with the annular ridge 29 carried on the raised portion and the plugs 30 carried on the outer portion of the device, to permit the inner side of the disc to fit closely against the raised and outer portions of the flange.

As in the case of the device 14, the device 27 preferably has four equally spaced-apart frusto-conically shaped plugs 30 having base diameters for fitting tightly within the upper ends of their respective bolt holes. Also, openings 31 are formed through the disc and each of the plugs 30 adjacent the outer sides of the plugs so as to receive fasteners 18 therethrough. These fasteners are adapted to extend through the openings and to have their lower ends bent into retaining positions, as indicated at 20 in FIG. 1A.

Preferably, each device is molded from styrofoam, or other suitable material which is sufficiently tough to absorb loads delivered against its upper side, but at the same time soft enough to avoid scratching or otherwise marring the surface of the ring groove. As well known in the art, integral parts of such material, such as the above described devices, may be molded with a minimum of time and expense.

The devices may be installed thereon merely by alignment of the plugs thereof with bolt holes in the grooves, and forcing of the plugs into the holes to dispose the inner side of the disc tightly against the outer side of the flange. Then, the fasteners need only be extended through the preformed openings 21, and bent over at their lower ends, as shown at 20. To remove the devices, the ends 20 of the fasteners need only be bent down and the disc lifted from the flange. Since they are substantially flat, and the fasteners are removable therefrom, the devices may be stacked one above the other with a minimum consumption of space.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the present invention without departing from the scope thereof, it is to be understood that all matter herein set forth or shown in the accompanying drawings is to be interpreted as illustrative and not in a limiting sense.

The invention having been described, what is claimed is:

1. For use in protecting a flange having an annular groove in the outer side thereof, and a circle of bolt holes therethrough concentrically outwardly of the groove, a device comprising a disc having one side adapted to be disposed against said outer side of the flange, an annular ridge on the one side of the disc for substantially filling the groove in the flange, a plurality of generally equally spaced-apart plugs on said one side of the disc for fitting closely within certain of the bolt holes in the flange, and a plurality of fasteners each being extendible through a plug to dispose an end thereof in position to bear against the inner side of the flange for holding the plug in its respective bolt hole.

2. A device of the character defined in claim 1, wherein openings are formed through the disc and plugs, and each fastener has one end which is enlarged for engaging the outer side of the flange, and another end which is bendable into its position for bearing against the inner side of the flange.

3. A device of the character defined in claim 2, wherein each said opening is generally tangent to the outer side of the plug.

4. For use in protecting a flange having an annular groove in the outer side thereof, and a circle of bolt holes therethrough concentrically outwardly of the groove, a device comprising a disc having one side adapted to be disposed against said outer side of the flange, an annular ridge on the one side of the disc for substantially filling the groove in the flange, a plurality of spaced-apart plugs on said one side of the disc for fitting closely within certain of the bolt holes in the flange, and a plurality of fasteners each being extendible through a plug to dispose an end thereof in position to bear against the inner side of the flange for holding the plug in its respective bolt hole.

5. A device of the character defined in claim 4, wherein openings are formed through the disc and plugs, and each fastener has one end which is enlarged for engaging the outer side of the flange, and another end which is bendable into its position for bearing against the inner side of the flange.

6. A device of the character defined in claim 5, wherein each said opening is generally tangent to the outer side of the plug.

7. For use in protecting a flange having an annular groove in the outer side thereof, and a circle of bolt holes therethrough concentrically outwardly of the groove, a device comprising a disc having one side adapted to be disposed against said outer side of the flange, an annular ridge on the one side of the disc for substantially filling the groove in the flange, a plug on said one side of the disc for fitting closely within a bolt hole in the flange, and a fastener extendible through the plug to dispose an end thereof in position to bear against the inner side of the flange for holding the plug in its respective bolt hole.

8. A device of the character defined in claim 7, wherein an opening is formed through the disc and plug, and the fastener has one end which is enlarged for engaging the outer side of the flange, and another end which is bendable into its position for bearing against the inner side of the flange.

9. A device of the character defined in claim 8, wherein said opening is generally tangent to the outer side of the plug.

* * * * *